United States Patent
Miyagi et al.

(10) Patent No.: US 11,023,908 B2
(45) Date of Patent: *Jun. 1, 2021

(54) INFORMATION PROCESSING APPARATUS FOR PERFORMING CUSTOMER GAZE ANALYSIS

(71) Applicant: TOSHIBA TEC KABUSHIKI KAISHA, Tokyo (JP)

(72) Inventors: Daisuke Miyagi, Mishima Shizuoka (JP); Tohru Kobayashi, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,549

(22) Filed: Feb. 3, 2020

(65) Prior Publication Data
US 2020/0175529 A1 Jun. 4, 2020

Related U.S. Application Data

(63) Continuation of application No. 15/369,864, filed on Dec. 5, 2016, now Pat. No. 10,600,065.

(30) Foreign Application Priority Data

Dec. 25, 2015 (JP) ................................ 2015-255038

(51) Int. Cl.
*G06Q 30/02* (2012.01)
*G06K 9/00* (2006.01)
(Continued)

(52) U.S. Cl.
CPC ........... *G06Q 30/0201* (2013.01); *G06K 9/00* (2013.01); *G06Q 20/20* (2013.01); *G06Q 20/202* (2013.01);
(Continued)

(58) Field of Classification Search
CPC .............. G06Q 30/0201; G06Q 20/20; G06Q 20/40145; G06Q 20/202; G06Q 20/204;
(Continued)

(56) References Cited

U.S. PATENT DOCUMENTS 6,296,185 B1 10/2001 Dejaeger
6,446,862 B1 9/2002 Mann
(Continued)

FOREIGN PATENT DOCUMENTS

JP 2011242873 A 12/2011
JP 2013065119 A 4/2013
(Continued)

OTHER PUBLICATIONS

Video analytics for retail AW Senior, L Brown, A Hampapur . . .—. . . on Advanced Video . . . , 2007 —ieeexplore.ieee.org (Year: 2007).*
(Continued)

*Primary Examiner* — Jonathan G Sterrett
(74) *Attorney, Agent, or Firm* — Kim & Stewart LLP

(57) ABSTRACT

In one embodiment, an information processing apparatus has an interface, a storage device, and a processor. The processor executes a control program stored in the storage device, to accept an image in which a prescribed area in a store has been imaged, via the interface, and detects a direction of a visual line of a person contained in the image. Further the processor determines a commodity which the person has browsed in the store, based on the direction of the visual line.

5 Claims, 8 Drawing Sheets

(51) Int. Cl.
*G06Q 20/20* (2012.01)
*G06Q 20/40* (2012.01)
*G06T 7/00* (2017.01)

(52) U.S. Cl.
CPC ..... *G06Q 20/204* (2013.01); *G06Q 20/40145* (2013.01); *G06T 7/0004* (2013.01); *G06T 2207/30108* (2013.01)

(58) Field of Classification Search
CPC .... G06K 9/00; G06K 9/00771; G06T 7/0004; G06T 2207/30108
See application file for complete search history.

(56) References Cited

U.S. PATENT DOCUMENTS

| | | | |
|---|---|---|---|
| 6,516,302 | B1 | 2/2003 | Deaton et al. |
| 6,571,279 | B1 | 5/2003 | Herz et al. |
| 6,741,967 | B1 | 5/2004 | Wu et al. |
| 7,930,199 | B1 | 4/2011 | Hill |
| 8,412,656 | B1 | 4/2013 | Baboo et al. |
| 8,615,479 | B2 | 12/2013 | Jung et al. |
| 2001/0014868 | A1 | 8/2001 | Herz et al. |
| 2002/0016740 | A1 | 2/2002 | Ogasawara |
| 2003/0059124 | A1 | 3/2003 | Center |
| 2005/0273376 | A1 | 12/2005 | Ouimet et al. |
| 2006/0093998 | A1 | 5/2006 | Vertegaal |
| 2006/0110008 | A1 | 5/2006 | Vertegaal et al. |
| 2006/0189886 | A1 | 8/2006 | Jones et al. |
| 2007/0174115 | A1 | 7/2007 | Chieu et al. |
| 2008/0104415 | A1 | 5/2008 | Palti-Wasserman et al. |
| 2008/0259274 | A1 | 10/2008 | Chinnock |
| 2009/0063256 | A1 | 3/2009 | Pradeep et al. |
| 2009/0141895 | A1 | 6/2009 | Anderson et al. |
| 2009/0271251 | A1 | 10/2009 | Sorensen et al. |
| 2009/0285454 | A1 | 11/2009 | Xu |
| 2010/0004977 | A1 | 1/2010 | Marci et al. |
| 2010/0088148 | A1 | 4/2010 | Presswala et al. |
| 2010/0100001 | A1 | 4/2010 | Aguilar et al. |
| 2011/0085700 | A1 | 4/2011 | Lee |
| 2011/0128223 | A1 | 6/2011 | Lashina et al. |
| 2011/0199486 | A1 | 8/2011 | Moriya |
| 2011/0237971 | A1 | 9/2011 | Pradeep et al. |
| 2011/0256520 | A1 | 10/2011 | Siefert |
| 2011/0288906 | A1 | 11/2011 | Thomas et al. |
| 2012/0108995 | A1 | 5/2012 | Pradeep et al. |
| 2013/0030915 | A1 | 1/2013 | Statler et al. |
| 2013/0188054 | A1 | 7/2013 | Weinblatt |
| 2013/0235347 | A1 | 9/2013 | Hennessey et al. |
| 2014/0002352 | A1 | 1/2014 | Jacob et al. |
| 2014/0152874 | A1 | 6/2014 | Clayton et al. |
| 2015/0213429 | A1 | 7/2015 | Kanamori |
| 2015/0278845 | A1* | 10/2015 | Sorem ................. G06Q 20/202 705/14.25 |
| 2016/0196575 | A1 | 7/2016 | Uchida et al. |
| 2017/0132650 | A1 | 5/2017 | McGuire |

FOREIGN PATENT DOCUMENTS

| | | |
|---|---|---|
| JP | 2013125293 A | 6/2013 |
| WO | 2015033575 A1 | 3/2015 |

OTHER PUBLICATIONS

Human behavior analysis at a point of sale R Sicre, H Nicolas—International Symposium on Visual Computing, 2010—Springer (Year: 2010).*
Improved Face Model Fitting on Video Sequences. X Liu, FW Wheeler, PH Tu—BMVC, 2007—cvlab.cse.msu.edu (Year: 2007).*
Japanese Office Action dated Aug. 27, 2019 in corresponding Japanese Patent Application No. 2015-255038, 8 pages (with Translation).
Extended European Search Report dated Dec. 10, 2018, filed in counterpart European Patent Application No. 16205288.0, 7 pages.
"What are customers looking at?", X Liu, N Krahnstoever, T Yu, P Tu—2007—computer.org (Year: 2007).
Towards a subject-centered analysis for automated video surveillance M Farenzena, L Bazzani, V Murino . . .—. . . Conference on Image . . . , 2009—Springer (Year: 2009).
Consumer decision patterns through eye gaze analysis S Castagnos, P Pu—Proceedings of the 2010 workshop on Eye gaze in . . . , 2010—dl.acm.org (Year: 2010).

* cited by examiner

INFORMATION PROCESSING APPARATUS FOR PERFORMING CUSTOMER GAZE ANALYSIS

CROSS-REFERENCE TO RELATED APPLICATIONS

This application is a continuation of U.S. patent application Ser. No. 15/369,864, filed on Dec. 5, 2016, which is based upon and claims the benefit of priority from the prior Japanese Patent Application No. 2015-255038, filed on Dec. 25, 2015, the entire contents of each of which are incorporated herein by reference.

FIELD

Embodiments described herein relate generally to an information processing apparatus.

BACKGROUND

In a store such as a supermarket, a customer walks around in the store while looking at a commodity. The customer looks at a commodity, to take an interest in the commodity. The customer takes an interest in the commodity, to have a desire to acquire the commodity. The customer may come to purchase the commodity through these stages. For the reason, the store analyzes an image imaged by a camera installed in the store, to grasp a flow line of a customer walking around in the store. The store judges a commodity arranged along the grasped flow line to be a commodity in which the customer is interested. The store tries to promote a commodity judged to be the commodity in which the customer is interested, to the customer.

However, only grasping a flow line of a customer is insufficient for grasping a commodity in which the customer is interested.

DETAILED DESCRIPTION

Figure 1:
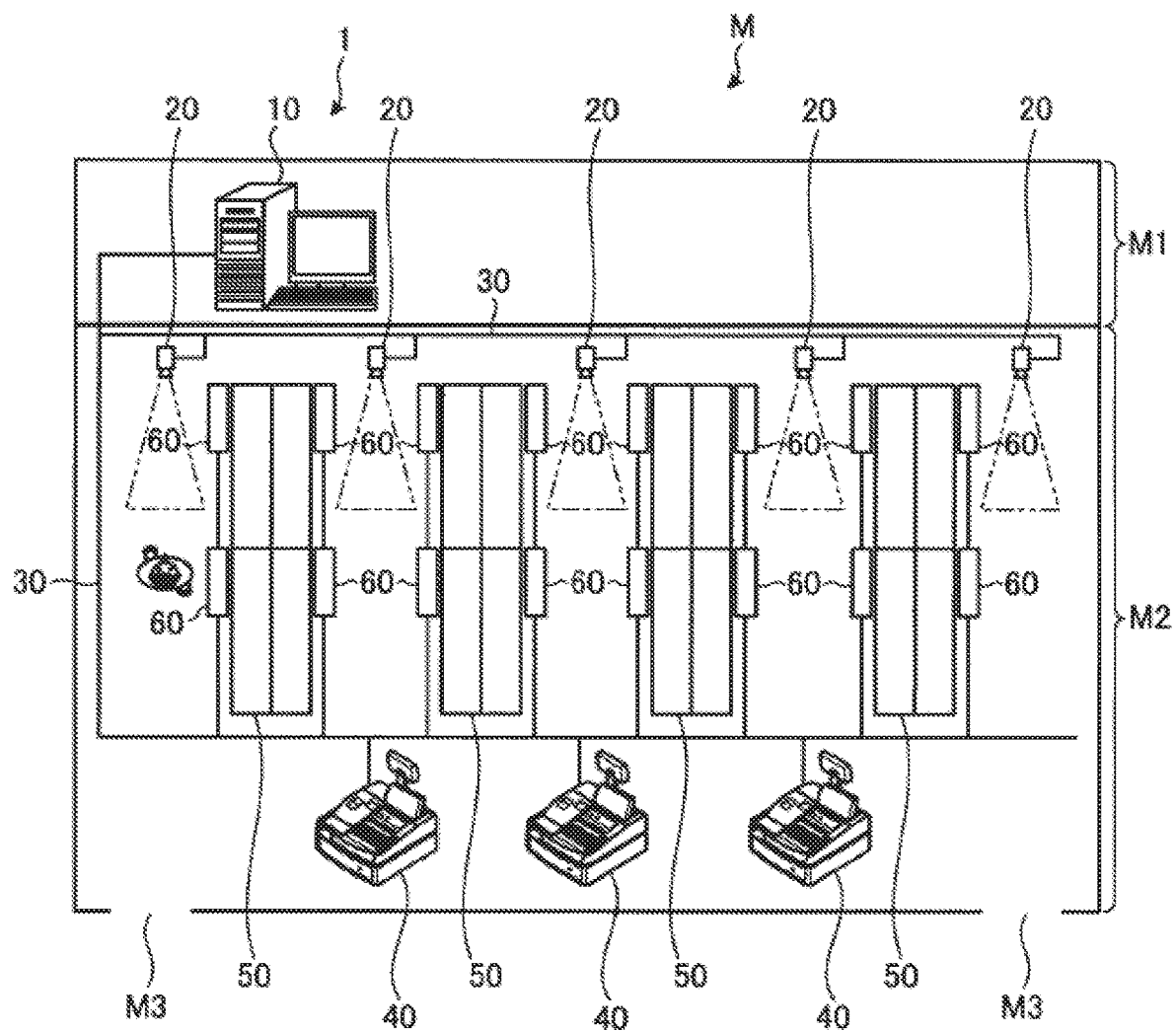
FIG. 1 is an explanation diagram showing an example in which a person authentication system including a server apparatus according to an embodiment is installed in a store.

According to one embodiment, an information processing apparatus has an interface, a storage device, and a processor. The interface communicates with an outside of the apparatus. The storage device stores a computer executable control program. The processor executes the control program stored in the storage device, to accept an image in which a prescribed area in a store has been imaged, via the interface. The processor detects a direction of a visual line of a person contained in the image. Further, the processor determines a commodity which the person has browsed in the store, based on the direction of the visual line.

Hereinafter, information processing apparatuses according to further embodiments will be described with reference to the drawings. In the drawings, the same symbols indicate the same or similar portions. The information processing apparatuses described hereinafter are not limited to the embodiments. An example of the information processing apparatuses according to the embodiments, a server apparatus will be described.

FIG. 1 is an explanation diagram showing an example of a case in which a person authentication system 1 according to an embodiment is installed in a store M. The person authentication system 1 has a server apparatus 10, a plurality of POS (Point Of Sale) terminals 40, a plurality of imaging devices 20, and a plurality of signages 60. As shown in FIG. 1, the store M where the person authentication system 1 is installed has a backyard M1, a sales floor M2, and doorways M3, when roughly classified. The backyard M1 is a place such as a commodity warehouse, and a place where packaging of a commodity and affairs relating to store operation such as order of a commodity are performed. In addition, the server apparatus 10 is installed in the backyard M1.

The sales floor M2 is a place where a commodity is sold. In the sales floor M2, the imaging device 20 for imaging a person (a customer, for example) looking around in the store M is provided. In addition, in the sales floor M2, the POS terminal 40 is provided. Further, in the sales floor M2, a shelf 50 on which a commodity is arranged, and the signage 60 to display related information described later of a commodity are provided.

The POS terminal 40 performs sales registration of a commodity which a customer purchases and settlement processing of the commodity which the customer purchases, and prints settlement information on a receipt sheet. In addition, the POS terminal 40 images a face image of a customer as described later at the time of performing the settlement processing, and transmits the imaged face image of the customer to the server apparatus 10. Further, the POS terminal 40 prints the related information of the commodity received from the server apparatus 10 on a receipt sheet, as described later.

The imaging device 20 includes a camera, for example. Hereinafter, the imaging device 20 is called a camera. The camera 20 emits a visible light, to image a moving image in a prescribed area of the store M. This moving image contains a customer looking around the above-described prescribed area of the store M. The above-described moving image is used for specifying the customer contained in this moving image. To specify a customer is to judge whether or not a customer contained in a moving image is a customer who is already registered in a memory portion (refer to a person authentication dictionary D1 of FIG. 2) described later. To specify a customer includes to authenticate a face of a customer. Further, the above-described moving image is registered in the person authentication dictionary D1, as described later. In other words, the camera 20 images a moving image for specifying a customer, and also a moving image for being registered in the person authentication dictionary D1. Further, the camera 20 emits infrared ray, and images a moving image for determining a visual line of a customer. Accordingly, the camera 20 emits visible light and infrared ray alternately at a definite time interval. And the camera 20 receives reflected light of the emitted visible light by a customer, and images a moving image for specifying a customer, and also a moving image for being registered in the person authentication dictionary D1. In addition, the camera 20 receives reflected light of the emitted infrared ray by an eye of a customer, and images a moving image for determining a direction of a visual line of the customer. In addition, since a visual line detecting method by infrared ray irradiation is publicly known, the detailed description thereof will be omitted.

The person authentication system 1 has one or more cameras 20. The camera 20 images a prescribed area around a passage in the store M which a customer passes through. Here, the camera 20 is connected to the server apparatus 10 by a LAN (Local Area Network) 30. The LAN 30 may be wired, or may be wireless. In addition, the LAN 30 may be various public networks. When visiting the store M, a customer passes through a passage in the store M to look around the sales floor M2, and selects a commodity of a purchase object. At this time, the camera 20 images a customer looking around the sales floor M2, as described above.

The server apparatus 10 is an information processing apparatus which authenticates a face of a customer from a moving image which the camera 20 has imaged, and further generates information (browsing information) of the commodity which the customer was browsing from the moving image. The server apparatus 10 stores the generated browsing information for each customer (refer to a registration file of FIG. 3). Further, the server apparatus 10 stores the identification information of the camera 20 which has imaged the customer, and its imaging time for each customer (refer to the registration file of FIG. 3). By this means, the server apparatus 10 can trace its action for each customer.

Generation of the above-described browsing information of a commodity is performed by determining a commodity which a customer is browsing from a direction of a visual line of the customer. The detail of the generation of browsing information will be described below. In addition, in the store M shown in FIG. 1, the five cameras 20, the three POS terminals 40, and four sets of shelves, each set being composed of the four shelves 50 are provided, but the respective numbers thereof are not limited to this, and they may be any numbers.

In addition, the camera 20 shown in FIG. 1 is arranged toward a direction in parallel with the shelf 50. But the arrangement position of the camera 20, and a direction in which the camera 20 is directed are not limited. For example the camera 20 may be arranged on the shelf 50, and may be arranged toward a direction vertical to the shelf 50. The signage 60 is a display having a liquid crystal display portion, for example. The signage 60 is installed at a passage where a customer passes through. The signages 60 are installed corresponding to the respective shelves 50, one for one, for example. The signage 60 is connected to the server apparatus 10, the camera 20 and the POS terminal 40 by the LAN 30, for example. The signage 60 displays related information of a commodity, so as to present the related information of the commodity arranged on the corresponding shelf 50 to a customer passing through a passage. The above-described related information of a commodity includes production place information, price information, bargain sale information, taste information of a commodity and so on arranged on a shelf. The related information of a commodity is previously stored in a commodity layout file F1 described later (refer to FIG. 2).

Figure 2:
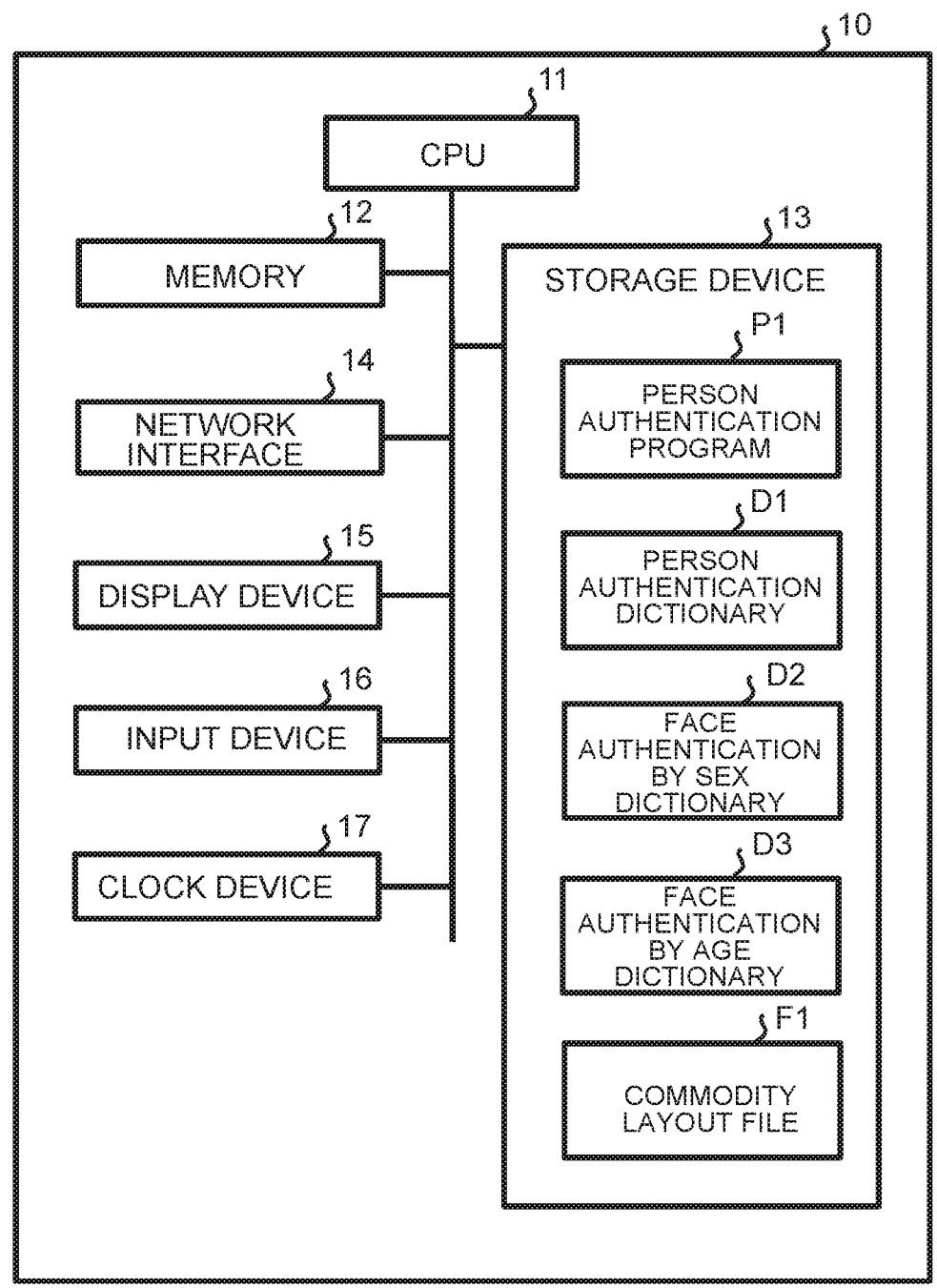
FIG. 2 is a block diagram showing a hardware configuration of the server apparatus according to the embodiment.

Next, the server apparatus 10 and the camera 20 of the person authentication system 1 will be described more in detail. To begin with, the server apparatus 10 will be described with reference to FIG. 2. FIG. 2 is a block diagram showing a hardware configuration of the server apparatus 10. As shown in FIG. 2, the server apparatus 10 has a processor 11, a memory 12, a storage device 13, a network interface 14 (hereinafter, simply called an I/F 14), a display device 15, an input device 16, and a clock device 17. The processor 11 controls the whole of the server apparatus 10. The processor is a CPU (Central Processing Unit), for example. Hereinafter, the processor 11 is called the CPU. The memory 12 temporarily stores data. The storage device 13 can read and write by a command from the CPU 11, and stores a control program and data and so on. Specifically, as shown in FIG. 2, the storage device 13 stores a person authentication program P1 as the control program. Further, the storage device 13 stores the person authentication dictionary D1, a face authentication by sex dictionary D2, a face authentication by age dictionary D3, and the commodity layout file F1.

The person authentication program P1 is a program which authenticates a face of a customer from a moving image which the camera 20 has imaged, and stores person authentication information of the authenticated customer in the person authentication dictionary D1. The person authentication dictionary D1 stores a registration file including the person authentication information for the each authenticated customer.

Figure 3:
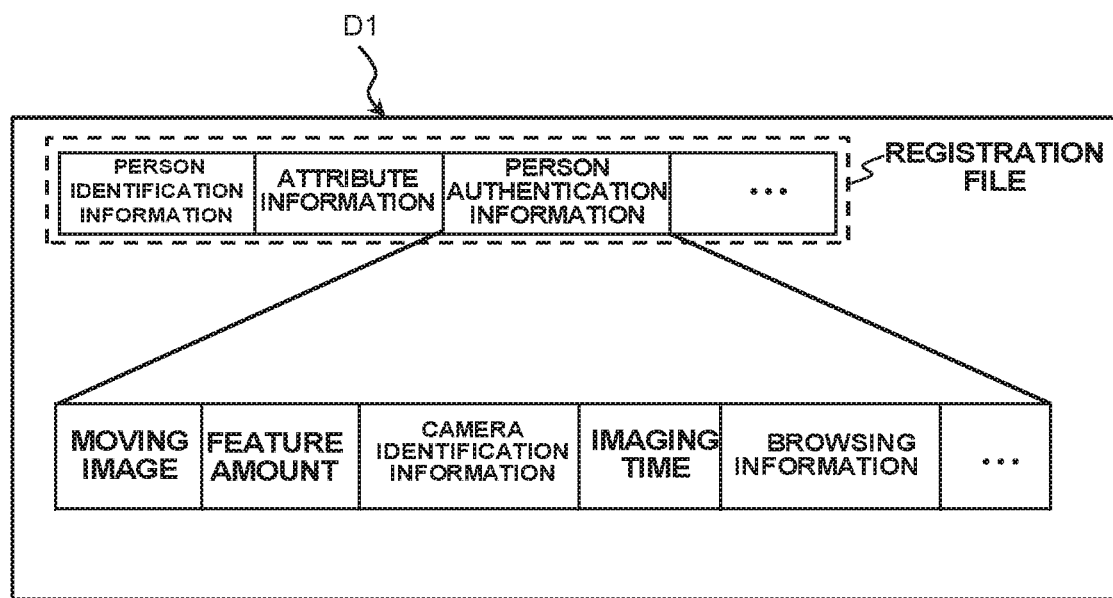
FIG. 3 is an explanation diagram showing an example of a data configuration of browsing information of a customer stored in the person authentication dictionary according to the embodiment.

FIG. 3 is an explanation diagram showing an example of a registration file of a certain customer which is stored in the person authentication dictionary D1. In the person authentication dictionary D1, registration files of one or more customers are stored. As shown in FIG. 3, person identification information is stored, in the registration file. The above-described person identification information is identification information which is assigned to each customer, and can identify a customer. Further, attribute information is stored in the registration file, in association with the person identification information. The attribute information is information including sex, age and so on of a customer. Further, one or more person authentication information are stored in the registration file, in association with the person identification information. The person authentication information has a data configuration shown in FIG. 3. The person authentication information is information relating to authentication of a customer extracted from a moving image. In addition, the person authentication information may be information relating to authentication of a customer extracted from a frame image. The frame image in this case is a frame image representing a moving image including a front face of a customer.

As shown in FIG. 3, the person authentication information has a moving image, a feature amount, camera identification information, and an imaging time. Further, the person authentication information has one or more browsing information. The moving image is an image which has been used for authenticating its customer. The moving image may be the above-described frame image. The feature amount is a feature amount of the relevant customer extracted from the moving image which has been used for authenticating the customer.

Here, the feature amount of a customer includes information showing the feature of the customer extracted from feature points (eye, nose, mouth, jaw and so on) of a face of the customer. Further, the feature amount of a customer includes a feature amount of a garment of the customer. The feature amount of a garment is information extracted from the garment of the customer, such as a color or the like of the clothes that the customer is wearing. The camera identification information is identification information for identifying the camera 20 which has imaged a moving image containing the customer. The imaging time is a time when the camera 20 has imaged the moving image. The above-described browsing information of a commodity is information of all commodities which a customer has browsed, in the moving image. The browsing information includes identification information, for example, which can identify a commodity, such as a commodity code for specifying the commodity. Further, the browsing information includes the number of times when a customer has browsed commodities, as described below.

The face authentication by sex dictionary D2 shown in FIG. 2 is a file in which information of a feature point of a face for each sex is previously stored. That is, the face authentication by sex dictionary D2 has a feature amount of a feature point of a face of a man, and a feature amount of a feature point of a face of a woman. The face authentication by sex dictionary D2 is used for determining whether a customer contained in a moving image of the camera 20 is a man or a woman. The above-described determination of man and woman is performed by comparing a feature amount extracted from a face image of a customer and a feature amount stored in the face authentication by sex dictionary D2. The information indicating the determined sex of the customer is stored in the registration file for the each customer, as the above-described attribute information.

The face authentication by age dictionary D3 shown in FIG. 2 is a file in which information of a feature point of a face for each age is previously stored. The face authentication by age dictionary D3 is used for determining age of a customer contained in a moving image of the camera 20. The above-described determination of age is performed by comparing a feature amount extracted from a face image of a customer and a feature amount stored in the face authentication by age dictionary D3. The information indicating the determined age of the customer is stored in the registration file for the each customer, as the above-described attribute information. In addition, the information to be stored in the face authentication by age dictionary D3 may be information of a feature point of a face for each aetas. Or, the information to be stored in the face authentication by age dictionary D3 may be information of a feature point of a face for each section indicating an age group, such as infancy, boyhood, adolescence, late middle age, middle age, upper age.

The commodity layout file F1 shown in FIG. 2 is a file in which information of a layout position of a commodity of the sales floor M2 is previously stored. In the commodity layout file F1, shelf identification information and identification information of a commodity, for example, are stored in association with each other. The shelf identification information is information which can identify each of the shelves 50. In addition, in the commodity layout file F1, one coordinate information indicating a layout position of a commodity in the shelf 50 is stored for each commodity, that is, in association with the identification information of the commodity. Accordingly, it can be found what commodity is arranged at what position of the what shelf 50, by the information stored in the commodity layout file F1. In addition, in the commodity layout file F1, related information of a commodity is stored in association with the identification information of the each commodity. In addition, the identification information of a commodity is a commodity code, for example, as described above.

The I/F 14 is connected to the LAN 30. Accordingly, the I/F 14 communicates with the camera 20, the signage 60, and the POS terminal 40, via the LAN 30. For example, the I/F 14 receives a moving image which the camera 20 has imaged, from the camera 20 via the LAN 30. In addition, the I/F 14 transmits the above-described related information of a commodity which a customer has browsed, to the signage 60 via the LAN 30. Further, the I/F 14 receives a face image of a customer imaged by the POS terminal 40, from the POS terminal 40 via the LAN 30. In addition, the I/F 14 transmits the related information of the commodity which the customer has browsed, to the POS terminal 40 via the LAN 30. In addition, the LAN 30 may be one of various public networks, as described above. The display device 15 is a display or the like to display various information. The input device 16 controls information inputted from an input device such as a keyboard and a mouse. In addition, the input device 16 controls information inputted from a touch panel which is laminated on a screen of the display device 15. The clock device 17 counts a time.

Next, the camera 20 will be described in more detail. The camera 20 images a prescribed area around a passage where the camera 20 is installed. A customer looking around the sales floor M2 passes through the passage. The camera 20 is connected to the LAN 30. The camera 20 transmits an imaged moving image to the server apparatus 10 via the LAN 30.

The camera 20 has an imaging unit not shown. The imaging unit images a photographic subject such as a customer and an object existing within an imaging range of the camera 20, to collect color image information. For example, the imaging unit senses visible light and infrared ray reflected from the surface of a photographic subject by a light receiving element, and converts the sensed visible light and infrared ray into electric signals. The light receiving element is a CMOS (Complementary Metal Oxide Semiconductor), a CCD (Charge Coupled Device) or the like. And the imaging unit converts the electric signal into digital data, to generate color image information of one frame corresponding to the imaging range.

Figure 4:
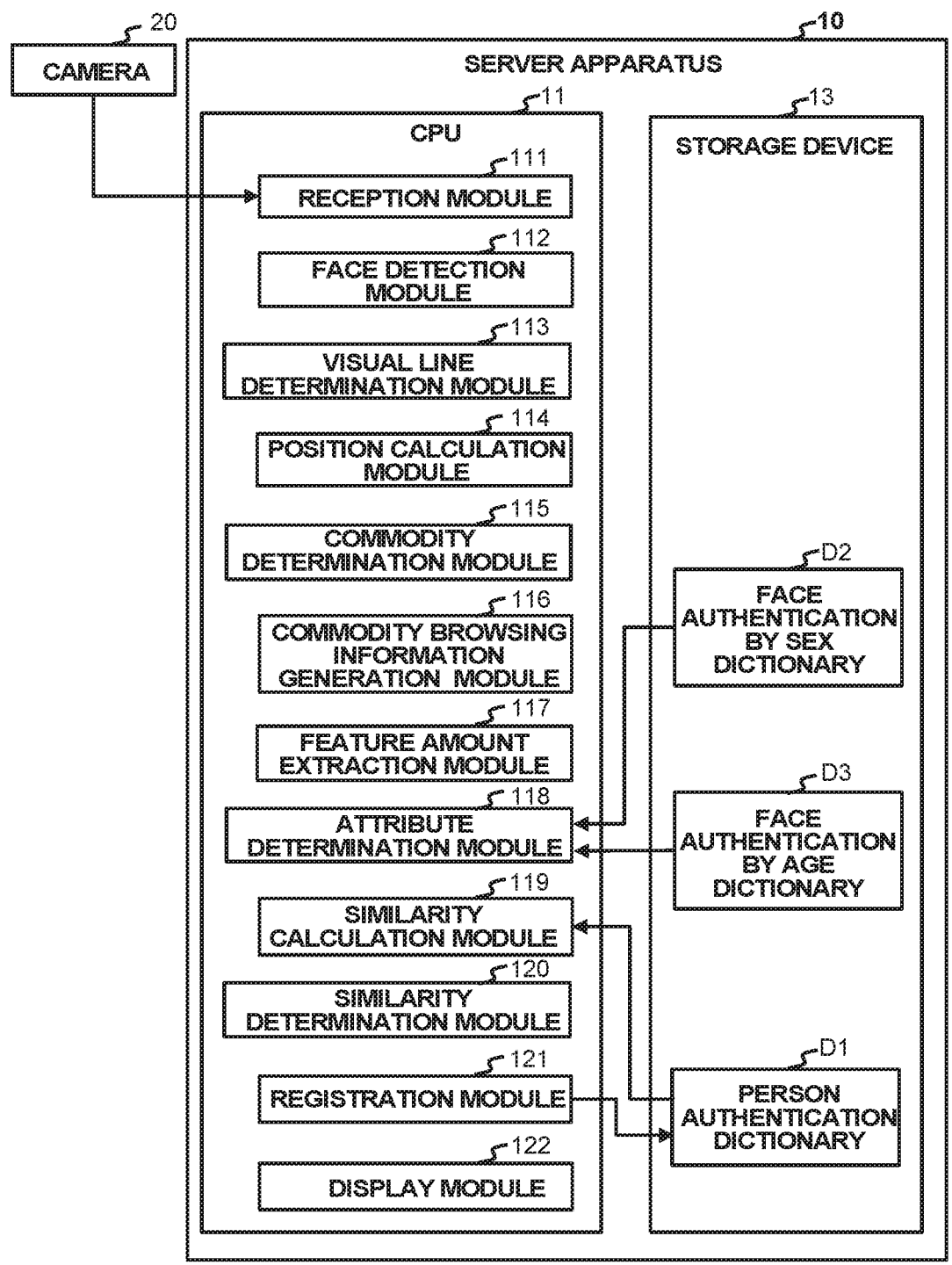
FIG. 4 is a block diagram showing a module configuration of the CPU of the server apparatus when the server apparatus functions as a part of the person authentication system according to the embodiment.

Next, a characteristic function of the person authentication system 1 including the above-described server apparatus 10 and camera 20 will be described. For example, the CPU 11 of the server apparatus 10 includes a plurality of CPU modules which execute the person authentication program P1 stored in the storage device 13. FIG. 4 is a block diagram showing a module configuration of the CPU 11 to execute the person authentication program P1, in the person authentication system 1 composed of the server apparatus 10 and the camera 20. As shown in FIG. 4, the CPU 11 has, as the CPU modules which execute the person authentication program P1, a reception module 111, a face detection module 112, a visual line determination module 113, a position calculation module 114, a commodity determination module 115, a commodity browsing information generation module 116, a feature amount extraction module 117, an attribute determination module 118, a similarity calculation module 119, a similarity determination module 120, a registration module 121, and a display module 122.

The reception module 111 functions as input means to accept an input of imaged data. Specifically, the reception module 111 accepts an input of imaged data such as a moving image and an imaging time received by the I/F 14. The face detection module 112 detects a face of a customer contained in the moving image accepted by the reception module 111. In addition, the face detection module 112 assigns new person identification information for each detected customer. Specifically, the face detection module 112 obtains coordinates indicating an area of a face using brightness information of the frame image, to detect a face image of the customer.

A detection method of obtaining a face area which the face detection module 112 performs may be any method. As an example of the detection method, there is a method or the like which obtains a correlation value while moving a previously prepared template within the inputted image data, and detects a position indicating the highest correlation value as a face area. In addition, a detection method using a face extraction method or the like which utilizes an eigenspace method or a subspace method may be applied to the detection method of a face area by the face detection module 112. In addition, a shape of a face area to be detected may be an arbitrary shape, and depending on the detection result of a direction or a size of a face, a shape of a face area may be made different.

The visual line determination module 113 is visual line determination means to determine a direction of a visual line of a customer, based on a moving image imaged by the camera 20. The visual line determination module 113 receives infrared ray emitted from the camera 20 and reflected by an eye of a customer, to determine a direction of a visual line of the customer. A method of determining a direction of a visual line of a customer which the visual line determination module 113 performs may be any method, and the visual line determination module 113 shall determine a direction of a visual line of a customer, using a publicly known technology. For example, the visual line determination module 113 uses a publicly known technology to determine a direction of a visual line of a customer, based on a face, an eyeball, cornea reflection of a customer contained in a moving image which the camera 20 has imaged. The visual line determination module 113 detects whether the visual line of a customer is directed to the right side, or directed to the left side.

The position calculation module 114 calculates a position where a customer contained in a moving image which the camera 20 has imaged exists. The camera 20 is arranged at a position where a prescribed area of the sales floor M2 can be imaged, as described above. The face detection module 112 detects a face image of a customer contained in a moving image, as described above, and further calculates coordinates indicating a position where the face image has been detected. Accordingly, the position calculation module 114 calculates a position where a customer of a face image contained in a moving image exists, based on the imaging range of the camera 20 and the coordinates of the face image.

The commodity determination module 115 is determination means to determine a commodity which the customer of the face detected by the face detection module 112 is browsing. Specifically, the commodity determination module 115 grasps, from the commodities stored in the commodity layout file F1, a commodity arranged in the direction of the above-described visual line of the customer existing at the above-described calculated position. The commodity determination module 115 determines this grasped commodity as a commodity which the customer is browsing. That is, the commodity determination module 115 determines a commodity which the customer is browsing, based on the position of the customer calculated by the position calculation module 114, and the direction (is the direction of the visual line a right direction or a left direction?) of the visual line of the customer determined by the visual line determination module 113.

Figure 5:
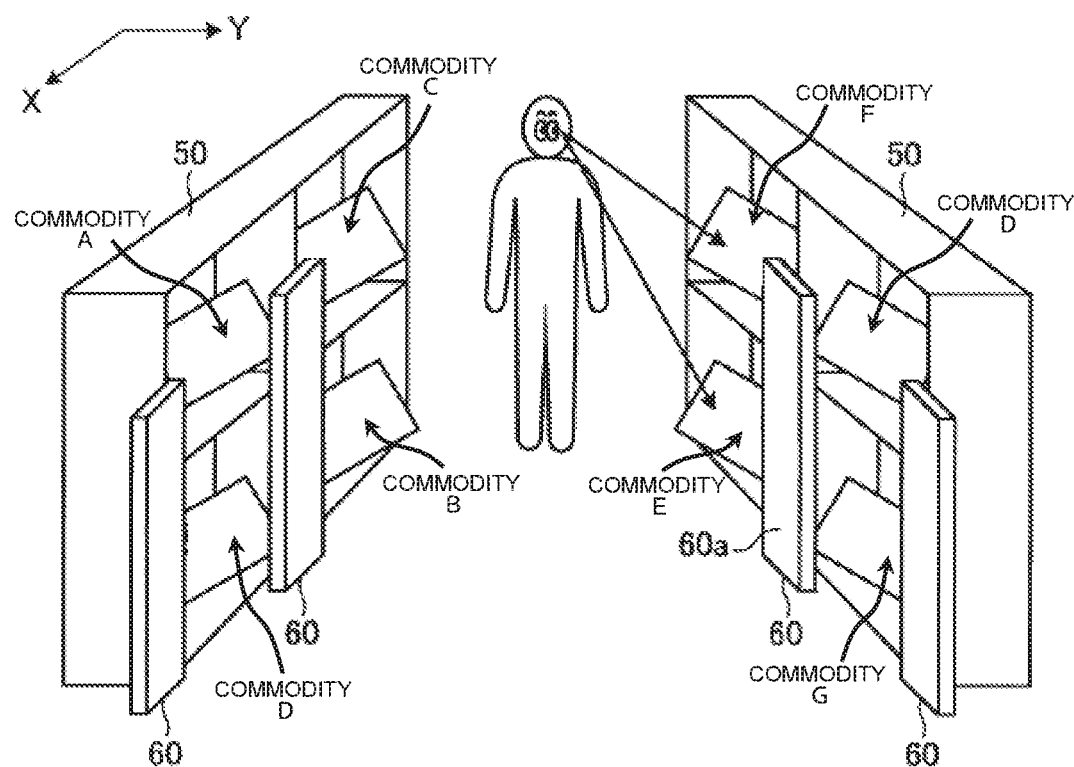
FIG. 5 is an explanation diagram showing an example of an image used for determining a commodity, in the server apparatus according to the embodiment.

Here, FIG. 5 is an explanation diagram showing an example of a frame image of a moving image which has been used for determination of a commodity which a customer is browsing. The camera 20 images a prescribed area of the sales floor M2. Accordingly, a customer contained in a frame image comes to exist in the imaging area of the camera 20. The face detection module 112 detects a face image of the customer from the frame image, and obtains coordinate positions in an X direction and a Y direction. By this means, the face detection module 112 calculates at what position of the imaging area of the camera 20 a face of the customer exists.

In addition, the visual line determination module 113 determines a direction of a visual line of a face of the customer contained in the frame image. And the visual line determination module 113 compares a place obtained from the above-described calculated position of the customer, and the above-described determined direction of the visual line with the commodity layout of the sales floor M2, and thereby can determine a commodity which the customer is browsing. In the case of the example of FIG. 5, the visual line determination module 113 determines that the customer is browsing the left side in the passing direction. And, the commodity determination module 115 determines that the customer is browsing a commodity E or a commodity F of FIG. 5, from the coordinates in the X direction and the Y direction where the customer exists at present. In this case, the related information of the commodity E or the related information of the commodity F is displayed on a signage 60a corresponding to the shelf 50 where the commodity E or the commodity F is arranged.

Returning to the description of FIG. 4, the commodity browsing information generation module 116 generates a commodity code that is identification information of the commodity which the customer of the above-described detected face has browsed, as browsing information of the commodity. The commodity browsing information generation module 116 stores the generated commodity code along with the browsed time in the person authentication dictionary D1 of the storage device 13. Further, the commodity browsing information generation module 116 counts up the number of browsing times of the above-described determined commodity by one. For example, when the above-described determined commodity is a commodity which has been determined for the first time, the commodity browsing information generation module 116 sets the number of browsing times to one. In addition, for example, when a commodity determined later is the same as a commodity which was previously determined, the commodity browsing information generation module 116 counts up the number of browsing times of the relevant commodity by one.

The feature amount extraction module 117, the similarity calculation module 119, and the similarity determination module 120 authenticate in cooperation whether or not a customer contained in the above-described moving image is a customer of a registration file which is already registered in the person authentication dictionary D1. To begin with, the feature amount extraction module 117 extracts a feature amount of a customer of a face detected by the face detection module 112. For example, the feature amount extraction module 117 detects a feature point of a face, such as an eye, a nose, a mouth, a jaw from the above-described face area. And the feature amount extraction module 117 extracts a feature amount for each feature point. The feature amount is obtained by parameterizing feature of appearance, such as a shape, a color shade of a surface, and a concave convex state of the feature point. In addition, a feature point of a face to be detected can be arbitrarily changed by setting and so on. In addition, a detection method of a feature point of a face which the feature amount extraction module 117 performs may be any method. The feature amount extraction module 117 shall use a publicly known technology as the detection method of a feature point of a face.

Further, the feature amount extraction module 117 extracts a feature amount from a garment of the customer detected by the face detection module 112. The feature amount extraction module 117 extracts a color from clothes, an accessory or the like which the customer is wearing, as the feature amount. By this means, not only a face of the customer, but also a garment of the customer is added, to the authentication as to whether or not the customer imaged by the camera 20 is a customer registered in the person authentication dictionary D1. By this means, accuracy of authentication of a customer can be increased.

The attribute determination module 118 determines an attribute of a customer contained in the moving image which the camera 20 has imaged. The attribute of a customer is sex, age or the like. The attribute determination module 118 compares a feature amount of a feature point extracted by the feature amount extraction module 117 with a feature amount stored in the face authentication by sex dictionary D2 of the storage device 13, to determine sex of the customer. Further, the attribute determination module 118 compares a feature amount of a feature point extracted by the feature amount extraction module 117 with a feature amount stored in the face authentication by age dictionary D3 of the storage device 13, to determine age of the customer. In addition, age may be a classification indicating aetas or age group.

The similarity calculation module 119 is calculation means for comparing a feature amount for each customer which is already registered in the person authentication dictionary D1 with the above-described extracted feature amount, to calculate similarity for each customer. Here, the similarity may be a value indicating how much a feature amount of a customer which the camera 20 has imaged and a feature amount of each customer which is already registered in the person authentication dictionary D1 are similar.

The similarity determination module 120 is specifying means for specifying a customer based on the calculated similarity. Here, to specify a customer is to determine whether or not a customer contained in an imaged moving image is a customer of a registration file which is already registered in the person authentication dictionary D1, based on whether or not the similarity is not less than a threshold value. In other words, to specify a customer is to determine whether or not a registration file of a customer contained in an imaged moving image is already registered in the person authentication dictionary D1, based on whether or not the similarity is not less than a threshold value. In the embodiment, three kinds of threshold values of a first threshold value (a first prescribed value), a second threshold value, a third threshold value (a second prescribed value) are provided for the above-described determination. The first threshold value is a threshold value of the smallest value. The first threshold value is a threshold value for judging that the similarity is low, for example, faces are not similar. That is, the first threshold value is a threshold value for judging that when the similarity is less than the first threshold value, two persons are not the same person, by the similarity determination module 120. The second threshold value is a threshold value of a value larger than the first threshold value. The second threshold value is a threshold value for judging that the similarity is high, for example, faces are similar. That is, the second threshold value is a threshold value wherein when the similarity is not less than the first threshold value and less than the second threshold value, it may be judged by the similarity determination module 120 that two persons are the same person. The third threshold value is a threshold value of a value larger than the second threshold value. The third threshold value is a threshold value for judging that the similarity is further high, that is, two persons are the same person. That is, the third threshold value is a threshold value for judging that when the similarity is not less than the second threshold value and less than the third threshold value, though garments are different, for example, two persons must be the same person (the possibility that two persons are the same person), by the similarity determination module 120. In addition, the third threshold value is a threshold value for judging that when the similarity is not less than the third threshold value, faces are of the same person and garments are the same, that is, two persons are the same person, by the CPU 11.

As described above, the similarity calculation module 119 calculates similarities of the whole customers already registered in the person authentication dictionary D1 with the imaged customer. The similarity determination module 120 compares the above-described similarities of the whole customers already registered in the person authentication dictionary D1 with the above-described threshold values. When the above-described similarities of the whole customers already registered in the person authentication dictionary D1 are less than the first threshold value (the first prescribed value), the similarity determination module 120 judges that the imaged customer is not the same person as the customers already registered in the person authentication dictionary D1, as described above. Accordingly, the similarity determination module 120 determines that the imaged customer is not registered in the person authentication dictionary D1. In addition, when the above-described similarities of one or a plurality of the customers already registered in the person authentication dictionary D1 are not less than the first threshold value and less than the second threshold value, the similarity determination module 120 judges that the customer of the highest similarity out of the above-described customers is the imaged customer. In this case, the similarity determination module 120 determines that the imaged customer is already registered in the person authentication dictionary D1. In addition, when the above-described similarity of any one of the customers already registered in the person authentication dictionary D1 is not less than the second threshold value and less than the third threshold value (the second prescribed value), the similarity determination module 120 determines that a possibility that the above-described any one customer is the same person as the imaged customer is high. Accordingly, the CPU 11 determines that the imaged customer is already registered in the person authentication dictionary D1. In addition, when the above-described similarity of any one of the customers already registered in the person authentication dictionary D1 is not less than the third threshold value (the second prescribed value), the similarity determination module 120 determines that the above-described any one customer is the same person as the imaged customer. Accordingly, also in this case, the similarity determination module 120 determines that the imaged customer is already registered in the person authentication dictionary D1.

The registration module 121 registers the person authentication information (refer to FIG. 3) relating to a moving image which the camera 20 has imaged, for the each customer of a face which the face detection module 112 has detected, to make the person authentication information to be stored in the storage device 13. The registration module 121 registers the moving image from which the similarity has been determined, the extracted feature amount, the identification information of the camera 20 which has transmitted the moving image, a imaging time when the moving image is imaged, and the above-described browsing information generated from the moving image in the person authentication dictionary D1, as the person authentication information, to make the person authentication information to be stored in the storage device 13.

Registration of the person authentication information of a customer which the registration module 121 performs includes new registration and additional registration. When it is determined by the similarity determination module 120 that a customer with the similarity of not less than the first threshold value is not registered in the person authentication dictionary D1, that is, person authentication information of a customer with the similarity of not less than the first threshold value is not registered in the person authentication dictionary D1, the registration module 121 newly registers the person authentication information in the person authentication dictionary D1. Specifically, the registration module 121 newly registers a registration file including the attribute information associated with the new person identification information which the face detection module 112 has assigned and the person authentication information, in the person authentication dictionary D1, as shown in FIG. 3.

On the other hand, when it is determined that the registration file of the customer with the similarity of not less than the first threshold value is already registered in the person authentication dictionary D1, the registration module 121 additionally registers the person authentic information, time sequentially, in the registration file of the customer with the similarity of not less than the first threshold value. That is, the registration module 121 registers the person authentication information relating to the imaging this time, in association with the person authentication information included in the registration file of the relevant customer which is already registered in the person authentication dictionary D1. The person authentication information is additionally registered by the registration module 121 in this manner, and thereby the person authentication information of the relevant customer (person identification information) increases. By this means, the similarity calculation module 119 can calculate similarities by comparing the customer contained in the above-described moving image with a plurality of the person authentication information included in the registration files of the customers already registered. For this reason, it is possible to improve reliability of the above-described determination result of the similarity determination module 117.

Hereinafter, new registration and additional registration of the person authentication information will be described more specifically. Regarding a customer whose similarities are all judged to be lower than the first threshold value (the first prescribed value) by the similarity determination module 120, the registration module 121 newly registers a registration file which has stored the person authentication information of a new customer in the person authentication dictionary D1. Regarding a customer whose similarities are judged to be not less than the first threshold value and less than the second threshold value by the similarity determination module 120, the registration module 121 additionally registers the person authentication information of the relevant customer, in the registration file of the customer of the highest similarity. Regarding a customer whose similarity is determined to be not less than the second threshold value and less than the third threshold value (the second prescribed value) by the similarity determination module 120, the registration module 121 additionally registers the person authentication information of the relevant customer, in the registration file of the relevant customer. Regarding a customer whose similarity is determined to be higher than the third threshold value by the similarity determination module 120, the registration module 121 does not newly register and does not additionally register the person authentication information of the relevant customer in any registration file. That is, in this case, the similarity determination module 120 judges that similarities of this customer are the same, in terms of a face and a garment. For example, there is a possibility that the relevant customer who had passed through a passage once has passed again through the passage on the same day, and the image of the relevant customer was imaged already. Accordingly, the registration module 121 does not additionally register the person authentication information of the relevant customer and the browsing information of the commodity which the relevant customer has browsed in the registration file.

The display module 122 is information providing means for displaying related information of the commodity determined by the commodity determination module 115 on the signage 60 which is installed at a position corresponding to the relevant determined commodity. Specifically, the display module 122 reads out the related information of the commodity determined by the commodity determination module 115, from the commodity layout file F1. The display module 122 transmits the read related information of the commodity to the signage 60 via the I/F 14.

Next, a person authentication processing which the CPU 11 of the server apparatus 10 according to the above-described embodiment executes in accordance with the person authentication program P1 will be described. The server apparatus 10 according to the embodiment executes a person authentication processing using a moving image which the camera 20 has imaged.

Figure 6:
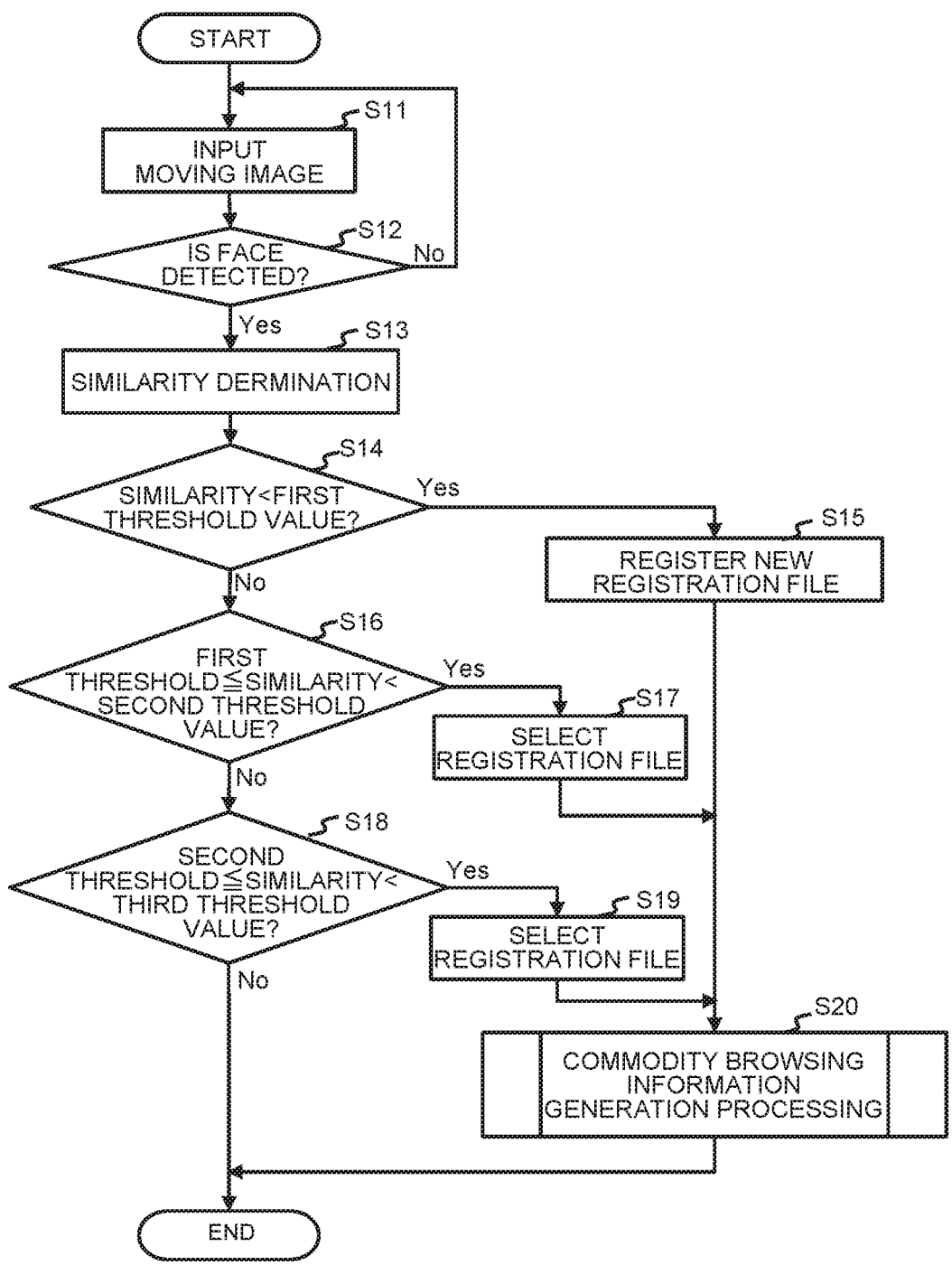
FIG. 6 is a flow chart showing a person authentication processing, in the server apparatus according to the embodiment.

FIG. 6 is a flow chart showing a person authentication processing which the CPU 11 of the server apparatus 10 executes in accordance with the person authentication program P1. To begin with, in a step S11, the CPU 11 (the reception module 111) of the server apparatus 10 inputs a moving image which the camera 20 has imaged via the I/F 14. Next, in a step S12, the CPU 11 (the face detection module 112) determines whether or not a face can be detected from the received moving image. When the CPU 11 cannot detect a face (No in step S12), the processing of the CPU 11 returns to the step S11, and waits for reception of a moving image by the I/F 14.

On the other hand, when the CPU 11 (the face detection module 112) has been able to detect a face (Yes in step S12), the processing of the CPU 11 proceeds to a step S13. In the step S13, the CPU 11 (the feature amount extraction module 117) firstly extracts a feature amount of the relevant face, based on the detected face. Next, the CPU (the similarity calculation module 119) compares the extracted feature amount with the feature amounts of the customers in the all registration files registered in the person authentication dictionary D1, to calculate similarities. And the CPU (the similarity determination module 120) determines similarity of the relevant customer, based on the calculated similarities.

Next, in a step S14, the CPU 11 (the similarity determination module 120) judges whether the similarities calculated by the similarity calculation module 119 are all less than a first threshold value (a first prescribed value). When the similarities are all less than the first threshold value, that is, when the CPU 11 judges that a registration file of the relevant customer does not exist in the person authentication dictionary D1 (Yes in step S14), the processing of the CPU 11 proceeds to a step S15. In the step S15, the CPU (the registration module 11) registers a new registration file in the person authentication dictionary D1. The registration file includes person authentication information, as described above. At this time, the CPU 11 (the attribute determination module 118) determines sex of the customer to be newly registered, based on the face authentication by sex dictionary D2. In addition, the CPU 11 determines age of the customer to be newly registered, based on the face authentication by age dictionary D3. And the CPU 11 (the registration module 121) includes the above-described determined sex and age in the above-described new registration file, as the attribute information. Subsequently, in a step S20, the CPU 11 executes a commodity browsing information generation processing. Then, the CPU 11 finishes the processing.

Figure 7:
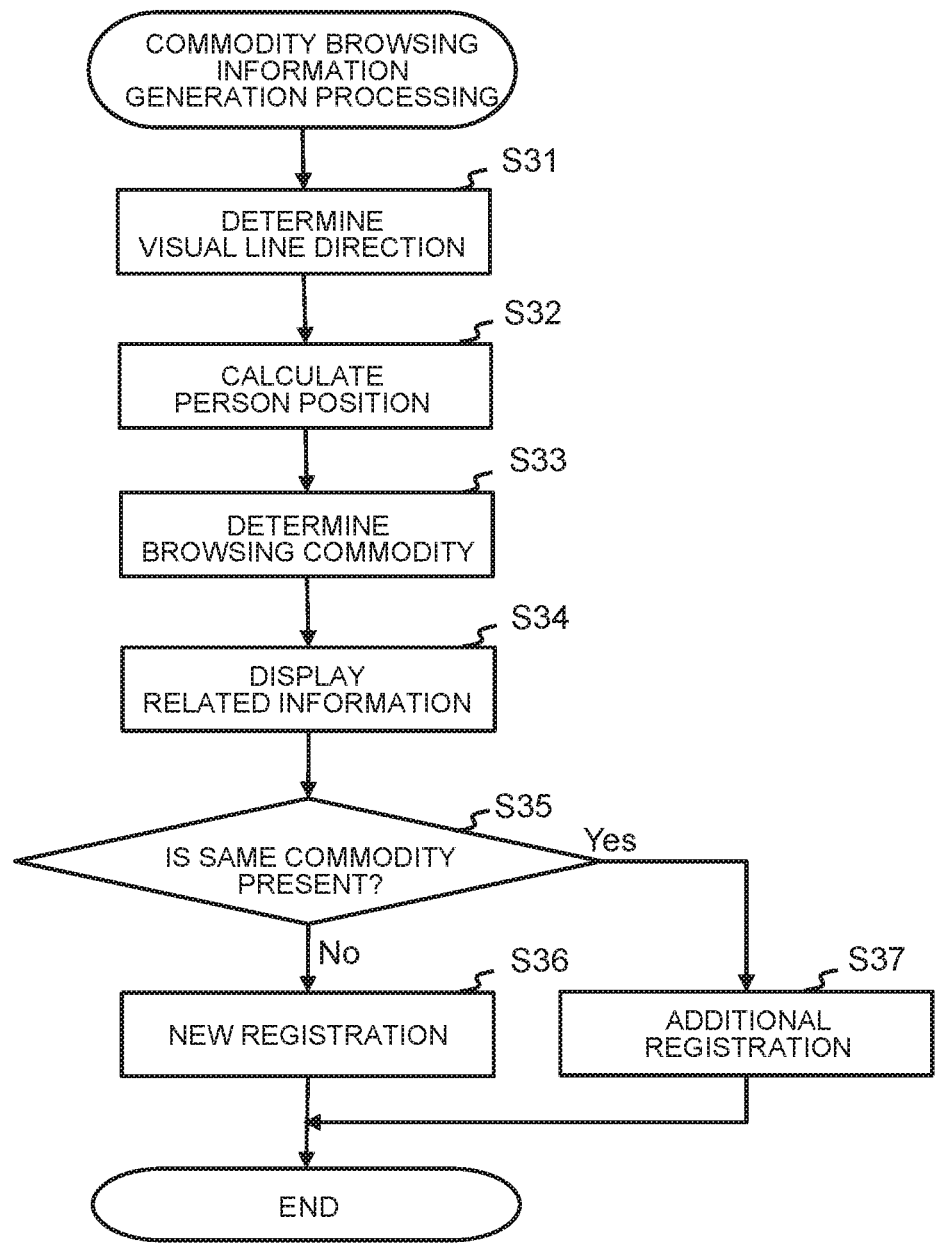
FIG. 7 is a flow chart showing a commodity browsing information generation processing, in the server apparatus according to the embodiment.

FIG. 7 is a flow chart showing the commodity browsing information generation processing in the step S20. As shown in FIG. 7, in a step S31, the CPU 11 (the visual line determination module 113) determines a direction of a visual line of a customer. Subsequently, in a step S32, the CPU 11 (the position calculation module 114) calculates a present position of the relevant customer. And in a step S33, the CPU (the commodity determination module 115) determines a commodity which the relevant customer is browsing, from the direction of the visual line of the customer determined by the visual line determination module 113, and the position of the customer calculated by the position calculation module 114. That is, the CPU 11 determines a commodity existing in the direction of the visual line of the relevant customer at the position where the relevant customer exists, based on the information of a layout position of a commodity stored in the commodity layout file F1.

Next, in a step S34, the CPU 11 (the display module 122) reads out related information of the relevant commodity from the commodity layout file F1. The CPU 11 (the display module 122) sends the read related information of the commodity to the signage 60 via the I/F 14, so as to display the read related information of the commodity on the signage 60 corresponding to the relevant commodity. Next, in a step S35, the CPU 11 (the commodity browsing information generation module 116) judges whether or not browsing information relating to the same commodity as the commodity determined by the commodity determination module 115 is already stored in the person authentication dictionary D1. When it is judged that the browsing information of the same commodity is already stored (Yes in step S35), the processing of the CPU 11 proceeds to a step S37. In the step S37, the CPU 11 (the commodity browsing information generation module 116) additionally stores the browsing information of the commodity determined in the step S33. That is, the CPU 11 counts up the number of browsing times of the relevant commodity which is stored in the commodity browsing information of the person authentication dictionary D1 by +1. In addition, the CPU 11 additionally stores a browsing time of the commodity in the browsing information. And the CPU 11 finishes the processing.

In addition, when the CPU 11 (the commodity browsing information generation module 116) judges that the browsing information relating to the same commodity is not stored yet (No in step S35), the processing of the CPU 11 proceeds to a step S36. In the step S36, the CPU 11 generates commodity browsing information relating to the new commodity. The browsing information includes a commodity code, for example, as described above. The CPU 11 stores the generated browsing information in the registration file of the relevant customer in the person authentication dictionary D1. And the CPU 11 finishes the processing.

Returning to the description of FIG. 6, when the CPU 11 judges that the similarities are not less than the first threshold value (the first prescribed value) (No in step S14), the processing of the CPU 11 proceeds to a step S16. In the step S16, the CPU 11 (the similarity determination module 120) judges whether or not the similarities calculated by the similarity calculation module 119 are not less than the first threshold value and less than the second threshold value. When the CPU 11 judges that the similarities are not less than the first threshold value and less than the second threshold value (Yes in step S16), the processing of the CPU 11 proceeds to a step S17. In the step S17, the CPU 11 (the registration module 121) selects one registration file stored in the person authentication dictionary D1. That is, the CPU 11 selects the registration files of the customers having the similarity not less than the first threshold value and less than the second threshold value from the registration files stored already in the person authentication dictionary D1. Further, the CPU 11 selects the registration file having the highest similarity from the selected registration files. And the CPU 11 executes the commodity browsing information generation processing in the above-described step S20.

In addition, when the CPU 11 (the similarity determination module 120) judges that the similarities are not less than the first threshold value and are not less than the second threshold value (No in step S16), the processing of the CPU 11 proceeds to a step S18. In the step S18 the CPU 11 judges presence or absence of one registration file in which the similarity calculated by the similarity calculation module 119 is not less than the second threshold value and less than the third threshold value. That the similarity exceeds the second threshold value and is less than the third threshold value (the second prescribed value) indicates that a customer imaged by the camera 20 is approximately the same person as a customer who is already registered in the person authentication dictionary D1. That is, when the registration file of the customer himself/herself imaged by the camera 20 is already registered in the person authentication dictionary D1, the similarity exceeds the second threshold value and becomes less than the third threshold value. When the CPU 11 judges that one registration file in which the similarity is not less than the second threshold value and less than the third threshold value is registered in the person authentication dictionary D1 (Yes in step S18), the processing of the CPU 11 proceeds to a step S19. In the step S19, the CPU (the registration module 121) selects the relevant one registration file.

In addition, when the CPU 11 (the similarity determination module 120) judges that the similarity is not less than the second threshold value and not less than the third threshold value (the second prescribed value) (No in step S18), the CPU 11 judges that the similarity is not less than third threshold value. Accordingly, the CPU 11 finishes the processing without executing the commodity browsing information generation processing in the above-described step S20.

The server apparatus 10 receives image information of a customer from the POS terminal 40 via the I/F 14. The server apparatus 10 reads out the related information of the commodity which the relevant customer has browsed from the registration file of the relevant customer of the person authentication dictionary D1, based on the received image information of the customer. And the server apparatus 10 transmits the related information of the commodity which the relevant customer has browsed to the relevant POS terminal 40 via the I/F 14. The POS terminal 40 prints the related information of the commodity received from the server apparatus 10 on a receipt sheet for the customer. The related information of the commodity to be printed on the receipt is the related information of the commodity which the relevant customer has browsed while passing through a passage in the store. Hereinafter, a control processing in which the server apparatus 10 transmits the related information of a commodity to the POS terminal 40.

Figure 8:
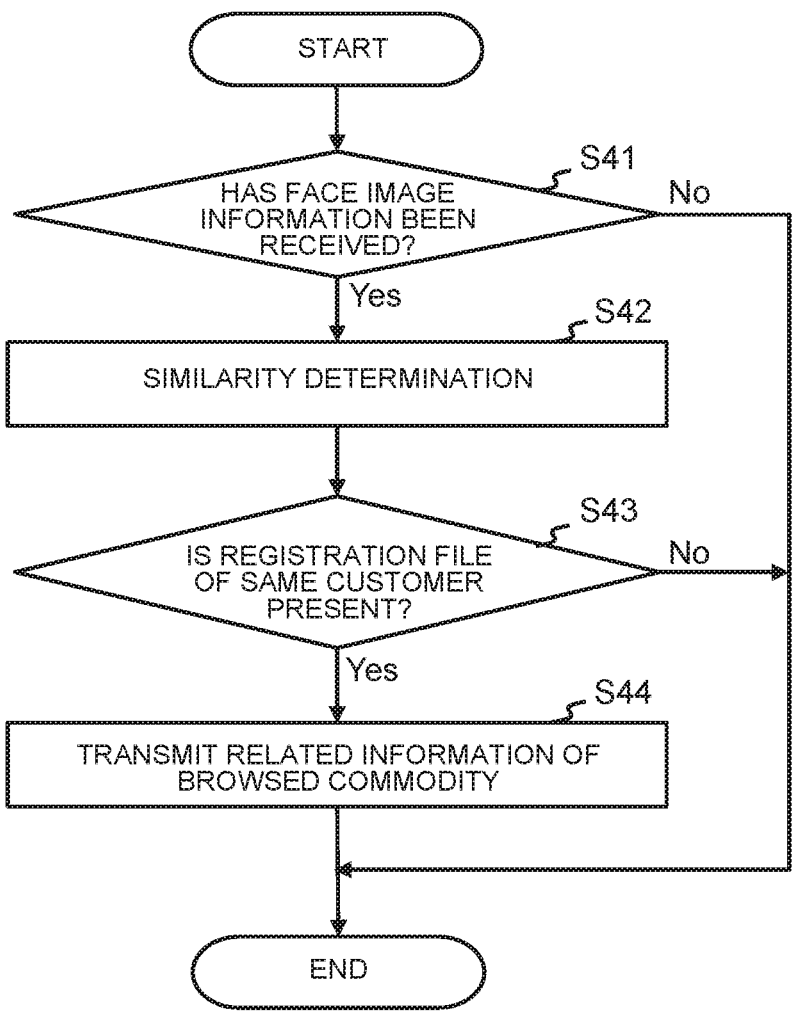
FIG. 8 is a flow chart showing a transmission processing of related information of a commodity, in the person authentication system according to the embodiment.

FIG. 8 is a flow chart showing a control processing in which the server apparatus 10 transmits related information of a commodity. When a customer performs a settlement processing of a commodity to be purchased, the POS terminal 40 images a face image of the relevant customer. The POS terminal 40 transmits the imaged face image of the customer to the server apparatus 10. As shown in FIG. 8, in a step S41, the CPU 11 (the reception module 111) of the server apparatus 10 judges whether or not the I/F 14 has received the information of the face image from the POS terminal 40. When the CPU 11 judges that the information of the face image has been received (Yes in step S41), the processing of the CPU 11 proceeds to a step S42. In the step S42, the CPU (the similarity determination module 120) compares a feature amount extracted from the relevant face image with the feature amounts stored in the person authentication dictionary D1, to determine similarities. And in a step S43, the CPU 11 judges presence or absence of the registration file of the same customer in the person authentication dictionary D1, based on the similarity determination result. When the CPU 11 judges that the registration file of the same customer is present (Yes in step S43), the processing of the CPU 11 proceeds to a step S44. In the step S44, the CPU 11 transmits the related information of the commodity which the relevant customer has browsed, and which is stored in the registration file of the above-described same customer, to the POS terminal 40 which has transmitted the above-described face image, via the I/F 14. For example, the CPU 11 transmits the related information of the commodity which the customer has browsed while passing through a passage in the same day. In addition, the CPU 11 transmits related information of a commodity of which the number of browsing times is many, for example. And the CPU 11 finishes the processing. In addition, when the CPU 11 judges that the information of the face image has not been received from the POS terminal 40 (No in step S41), and when the CPU judges that the same registration file is not present (No in step S43), the CPU 11 finishes the processing.

According to the above-described embodiment, the server apparatus 10 determines a direction of a visual line of a customer passing through a passage, based on an image imaged by the camera 20, to determine a commodity which the relevant customer is browsing. For the reason, the server apparatus 10 can more accurately grasp a commodity in which a customer looking around in a store is interested.

In addition, in the above-described embodiment, the CPU (the reception module 111) receives a moving image imaged by the camera 20, and thereby the server apparatus 10 accepts an input of the moving image, but the above-described moving image may be a video file which the camera 20 imaged in past times and was stored.

In addition, in the embodiment, the CPU 11 (the position calculation module 114) of the server apparatus 10 calculates a position of a customer, and further the CPU 11 (the visual line determination module 113) determines a direction of a visual line of the customer. And the CPU 11 (the commodity determination module 115) determines a commodity which the customer is browsing, based on the position of the above-described customer, the direction of the visual line of the above-described customer, and the commodity layout file F1. However, the CPU 11 may recognize a commodity (a commodity name) from a frame image of a moving image imaged by a camera 20a, using a publicly known object recognition technology.

In addition, the programs to be executed in the respective devices of the present embodiment or the modification are provided with being previously incorporated in a ROM or the like, but the above-described programs to be executed are not limited to this. For example, the program to be executed in the information processing apparatus of the present embodiment may be provided while being recorded in a computer readable recording medium, such as a CD-ROM, a flexible disk (FD), a CD-R, a DVD (Digital Versatile Disk) in a file form of an installable format or an executable format. Further, the storage medium is not limited to a medium independent from a computer, or an incorporated system, but a storage medium which stores or temporarily stores a program transmitted by a LAN or Internet by downloading is also included.

Further, the program to be executed in the information processing apparatus of the present embodiment is stored on a computer connected to a network such as Internet, and may be provided by being downloaded through the network. In addition, the program to be executed in the information processing apparatus of the present embodiment may be provided or distributed via a network such as Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus that detects a person in a store by using a camera and determines identification information of a commodity which the detected person has browsed in the store, the information processing apparatus comprising:
 an interface to communicate with a settlement terminal that performs sales registration and settlement processing of commodities;
 a storage device to store;
  a computer executable control program;
  with respect to each of registered persons, a person registration file including image feature information of the registered person in association with identification information of each of one or more commodities that has been browsed by the registered person, and a number of times each of the one or more commodities has been browsed by the registered person; and a commodity file including, with respect to each of commodities, related information of the commodity in association with identification of the commodity; and a processor, which executes the control program stored in the storage device, to:

determine whether or not the determined identification information of the commodity which the detected person has browsed in the store is stored in the person registration file corresponding to the detected person;

update the person registration file corresponding to the detected person based on a determination result of whether or not the determined identification information of the commodity which the detected person has browsed in the store is stored in the person registration file corresponding to the detected person;

receive face image information of a person from the settlement terminal via the interface;

determine whether or not the person of which face image information is received from the settlement terminal is the same as the detected person based on comparison of the face image information received from the settlement terminal with the image feature information included one or more person registration files stored in the storage device; and in a case determining that the person of which face image information is received from the settlement terminal is the same as the detected person, select a frequently-browsed commodity based on the number of times included in the person registration file corresponding to the detected person, acquire the related information of the frequently-browsed commodity from the related information of the commodities included in the commodity file, and transmit the related information of the frequently-browsed commodity, via the interface to the settlement terminal.

2. The information processing apparatus according to claim 1, wherein:

the related information of the commodities included in the commodity file includes at least one of production place information of the commodities, price information of the commodities, bargain sale information of the commodities, and taste information of the commodities.

3. The information processing apparatus according to claim 1, wherein:

the settlement terminal includes a point-of-sales (POS) terminal provided in the store, and the processor transmits the related information of the frequently-browsed commodity to the POS terminal provided in the store via the interface.

4. The information processing apparatus according to claim 1, wherein:

the processor further transmits the related information of the frequently-browsed commodity to a signage provided in the store via the interface.

5. The information processing apparatus according to claim 1, wherein:

in a case determining that the person of which face image information is received from the settlement terminal is the same as the detected person, the processor transmits the related information of the frequently-browsed commodity via the interface to the settlement terminal, such that the settlement terminal prints the related information on a receipt sheet for a transaction with the detected person.

\* \* \* \* \*